United States Patent [19]
Yamada

[11] Patent Number: 5,552,981
[45] Date of Patent: Sep. 3, 1996

[54] ELECTRONIC APPARATUS

[75] Inventor: Masanori Yamada, Kawasaki, Japan

[73] Assignee: Canon Kabushiki Kaisha, Tokyo, Japan

[21] Appl. No.: 275,334

[22] Filed: Jul. 14, 1994

Related U.S. Application Data

[63] Continuation of Ser. No. 857,273, Mar. 25, 1992, abandoned.

[30] Foreign Application Priority Data

Apr. 15, 1991 [JP] Japan ..................................... 3-082146

[51] Int. Cl.⁶ .......................... G05B 15/00; G06F 15/163
[52] U.S. Cl. .................... 364/132; 364/131; 395/200.05; 395/430
[58] Field of Search ..................................... 364/131–134; 395/430, 200.01, 200.05

[56] References Cited

U.S. PATENT DOCUMENTS

| 4,123,794 | 10/1978 | Matsumoto | 364/134 |
|---|---|---|---|
| 4,445,174 | 4/1984 | Fletcher | 364/134 |
| 4,550,366 | 10/1985 | Toyama et al. | 364/136 |
| 4,590,551 | 5/1986 | Mathews | 395/200 |
| 4,622,630 | 11/1986 | Vora et al. | 364/134 |
| 4,628,436 | 12/1986 | Okamoto et al. | 364/131 |
| 4,752,871 | 6/1988 | Sparks et al. | 364/200 |
| 4,803,618 | 2/1989 | Ita et al. | 364/134 |
| 4,903,190 | 2/1990 | Akai | 364/131 |
| 4,942,534 | 7/1990 | Yokoyama et al. | 364/468 |
| 5,053,797 | 10/1991 | Samuels et al. | 364/DIG. 2 |
| 5,068,821 | 11/1991 | Sexton et al. | 364/131 |
| 5,146,561 | 9/1992 | Carey et al. | 395/200 |

*Primary Examiner*—Paul P. Gordon
*Attorney, Agent, or Firm*—Fitzpatrick, Cella, Harper & Scinto

[57] ABSTRACT

A memory card stores programs and constant data for both a master CPU and a slave CPU. The master CPU identifies a header portion of the memory card attached to a card adapter to identify the storage locations of the data for the master CPU and the slave CPU, the size thereof and the addresses in RAMs at which the data for the master CPU and that for the slave CPU are stored. The master CPU writes the data for the master CPU in the RAM while it serially transfers the data for the slave CPU to the slave CPU and writes it in the RAM for the slave CPU. The individual CPUs perform control of loads according to the data in the RAMs.

6 Claims, 7 Drawing Sheets

ELECTRONIC APPARATUS

This application is a continuation of application Ser. No. 07/857,273 filed Mar. 25, 1992, which is now abandoned.

BACKGROUND OF THE INVENTION

1. Field of the Invention

The present invention relates to an electronic apparatus, and more particularly, to an electronic apparatus of the type which is controlled using a plurality of microcomputers.

2. Description of the Related Art

In a conventional electronic apparatus having microcomputers, built-in control programs and constant data are stored in a ROM fabricated on a substrate. The types of ROMs used in such an apparatus include an EPROM in which data can be rewritten electrically and the data stored in it are erasable using ultraviolet radiation, or a mask ROM in which data cannot be rewritten or erased.

When the built-in control programs stored in the ROM fail or when the specifications of the programs are to be changed, the EPROM or mask ROM must be replaced with a new one having the desired programs.

To overcome this drawback, supply of the built-in control programs and constant data from a memory card or a floppy disk has been considered, like the application programs of a personal computer. The control programs and constant data supplied from the memory card or the floppy disk are stored temporarily in a memory in which data can be written, such as a RAM, and are then executed.

However, in the aforementioned type of electronic apparatus having a plurality of microcomputers, means must be provided in each of the microcomputers for reading the control programs and constant data from the memory card or floppy disk into each individual microcomputer, thus increasing the overall size and production cost of the apparatus.

SUMMARY OF THE INVENTION

One object of the present invention is to improve an electronic apparatus which is controlled by a plurality of microcomputers.

Another object of the present invention is to provide an electronic apparatus having a plurality of microcomputers which allows for efficient supply of programs to each of the individual microcomputers.

To achieve the aforementioned objects, the present invention provides an electronic apparatus in which programs for the individual microcomputers are read out from a storage medium which can be attached to and removed from the apparatus and in which the programs are then transferred by a communication between the microcomputers to the corresponding microcomputer so as to supply the programs to each of the individual microcomputers.

Other objects and advantages of the invention will become apparent during the following description taken in connection with the accompanying drawings.

DETAILED DESCRIPTION OF THE PREFERRED EMBODIMENTS

Embodiments of the present invention will be described below with reference to the accompanying drawings.

Figure 1:
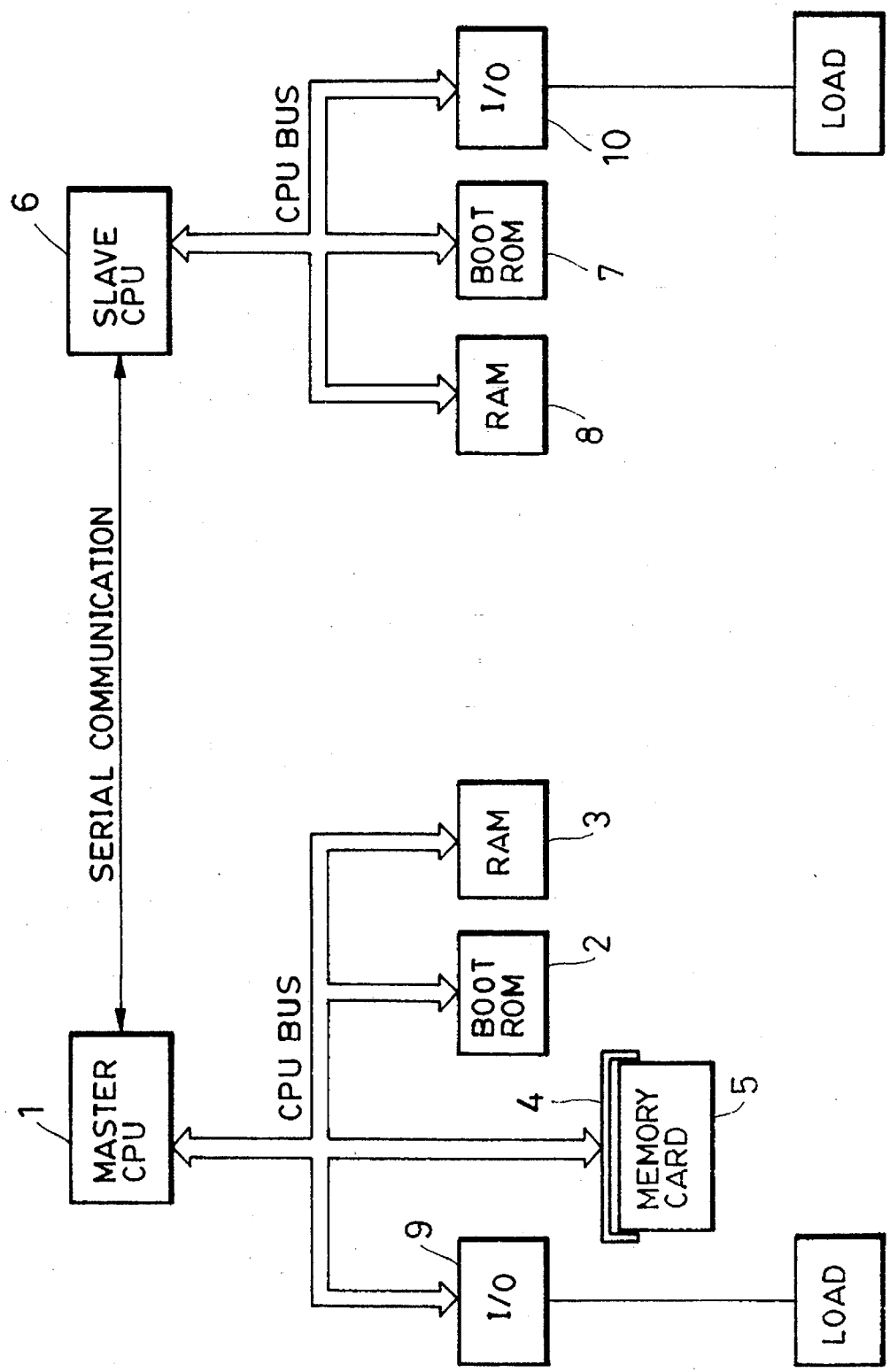
FIG. 1 is a block diagram of a first embodiment of an electronic apparatus according to the present invention.

FIG. 1 is a block diagram of an electronic apparatus illustrating the basic structure of a first embodiment of the present invention.

In the structure shown in FIG. 1, a master CPU (central processing unit) 1 is connected via a CPU bus to a boot ROM (read-only memory) 2 and to a RAM (random-access memory) 3 which stores the programs and constant data supplied from an external device. The RAM 3 is also used as the work area of the master CPU 1. The master CPU 1 is also connected via the CPU bus to a memory card 5 which stores the programs and constant data to be supplied therefrom. The master CPU 1 accesses the memory card 5 through a card adapter 4. A slave CPU 6 is connected to a boot ROM 7 and to a RAM 8 which stores the programs and constant data supplied from an external device. The RAM 8 is also used as the work area of the slave CPU 6. Loads which are to be controlled by the master CPU 1 and the slave CPU 6 are respectively connected to the CPUs 1 and 6 through I/Os 9 and 10. As shown in FIG. 1, the master CPU 1 and the slave CPU 6 exchange data with each other by serial communication.

In the electronic apparatus arranged in the manner mentioned above, when the apparatus is switched on, the slave CPU 6 performs an initialization program necessary only to make the slave CPU 6 operate using the program stored in the boot ROM 7. This initialization program also includes the program which makes the slave CPU 6 ready for serial communication with the master CPU 1. Consequently, the slave CPU 6 is put into a waiting state in which it waits for the data from the master CPU 1 through the serial communication.

After the apparatus is switched on, the master CPU 1 executes the necessary initialization according to the program stored in the boot ROM 2 (which includes the program for making the master CPU 1 initialized for serial communication), as in the case of the slave CPU 6. Thereafter, the master CPU 1 reads out the memory contents of the memory card 5 attached to the card adapter 4. If the memory contents which are read out are programs and constant data (hereinafter both the programs and the constant data being referred to simply as program data) for the master CPU 1, they are stored in the RAM 3. If the memory contents are program data for the slave CPU 6, the master CPU 1 transmits them to the slave CPU 6 through serial communication. The slave CPU 6 stores the program data received from the master CPU 1 in the RAM 8.

After all the necessary data are read out from the memory card 5, the master CPU 1 initiates control operations according to the programs stored in the RAM 3. The slave CPU 6 initiates control operations according to the programs stored in the RAM 8.

The structure of the program data in the memory card 5 will be described below with reference to FIG. 5.

Figure 5:
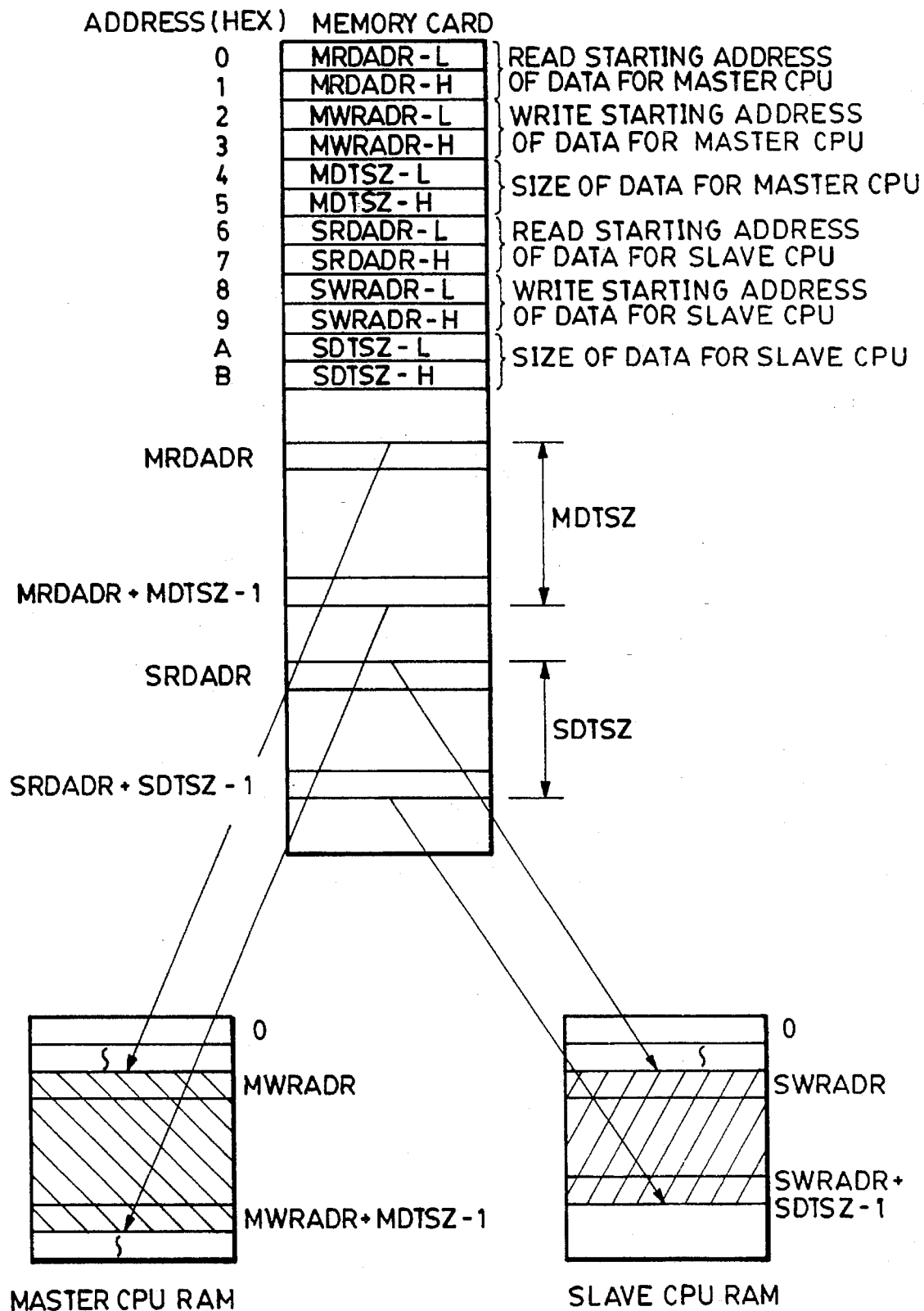
FIG. 5 illustrates how data is stored in a memory card used in the embodiments of the present invention.

As shown in FIG. 5, in the memory card 5, the addresses in the memory card 5 of the program data for the master CPU (MRDADR-L (low byte) and MRDADR-H (high byte)) and the slave CPU (SRDADR-L and SRDADR-H), the sizes of the data (MDTSZ-L, MDTSZ-H, SDTSZ-L and SDTSZ-H), and the addresses in the RAMs at which the program data for the master CPU (MWRADR-L and MWRADR-H) and that for the slave CPU (SWRADR-L and SWRADR-H) are to be stored for execution are written in an address space of 12 bytes from address location 00 (Hex) to 0B (Hex). In other words, it is possible to obtain the locations in the memory card 5 at which the program data for the master CPU are stored, the locations at which the program data for the slave CPU are stored, and the locations in the respective RAMs at which the data is to be written, by referring to a header portion (from address 00 (Hex) to address 0B (Hex)) of the memory card 5.

The operation of the master CPU 1 and that of the slave CPU 6 when the apparatus arranged in the aforementioned manner is switched on will be described below.

Figure 6:
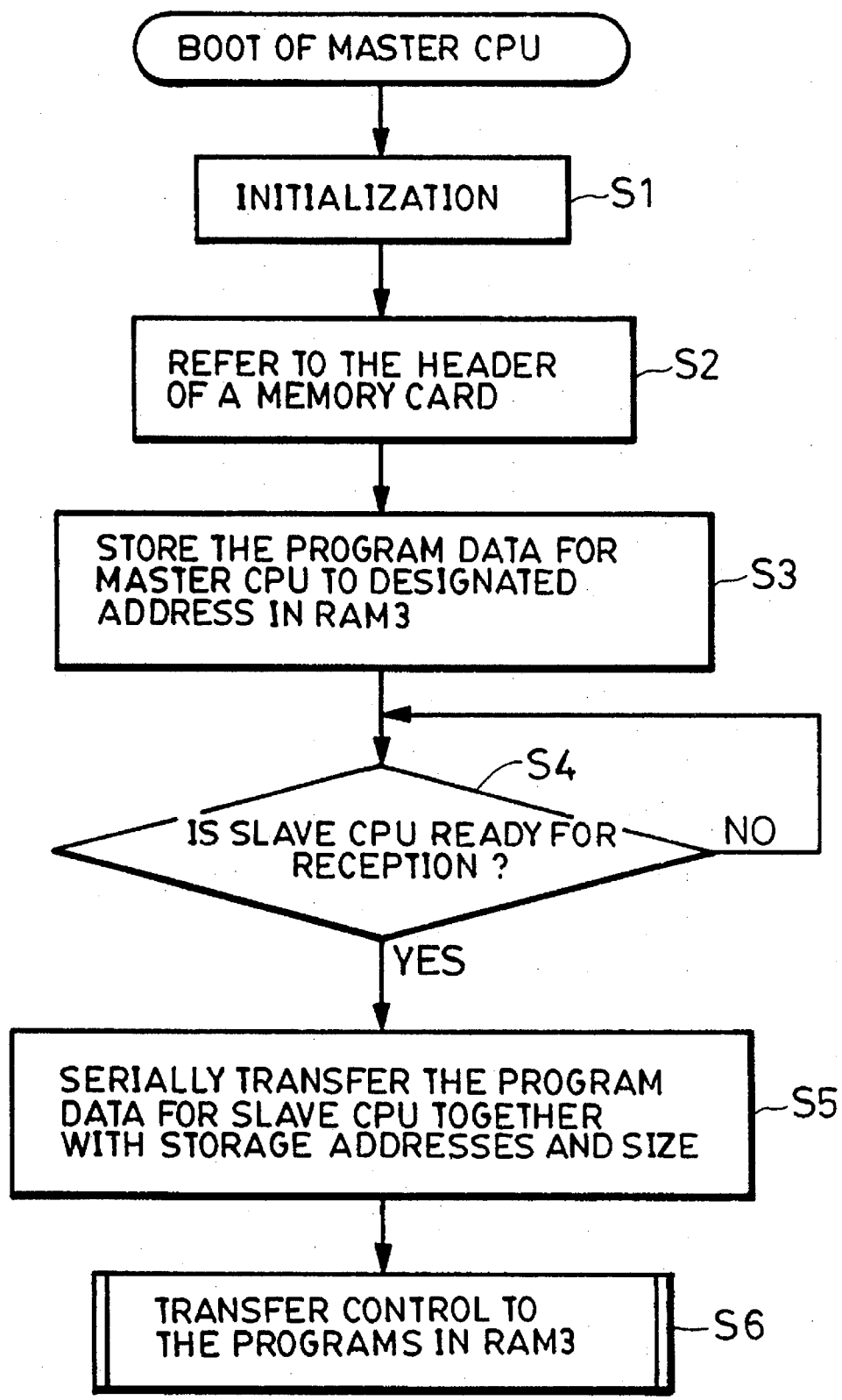
FIG. 6 is a flowchart showing the contents of a boot program for the master CPU which is used in the first embodiment.

First, the sequence of operations of the master CPU 1 will be explained with reference to FIG. 6. It is to be noted that the program related to the flowchart of FIG. 6 is stored in the boot ROM 2.

When the apparatus is switched on, the master CPU 1 performs initialization associated with individual circuits (not shown) which are under the control of the master CPU 1 as well as initialization associated with serial communication with the slave CPU 6.

Next, in step S2, the master CPU 1 refers to the header of the memory card 5 mounted through the card adapter 4 to check the storage locations and size of the program data for the master CPU 1 and those of the program data for the slave CPU. Next, in step S3, the master CPU 1 reads in the program data for the master CPU and writes it at the designated addresses in the RAM 3. Thereafter, the master CPU 1 checks whether or not the slave CPU 6 is ready for serial reception in step S4. If it is determined that the slave CPU 6 is ready for serial reception, the master CPU 1 transfers first the addresses to which the program data for the slave CPU 6 are to be stored and the size thereof and then the program data itself, so that the program data is stored in RAM 8.

When the program data for the master CPU 1 has been stored in the RAM 3 and transfer of the program data to the slave CPU 6 has been completed, control of the master CPU 1 is transferred to the programs stored in the RAM 3 (in a practical operation, the address in the RAM 3 is assigned to a program counter PC of the master CPU 1).

Figure 7:
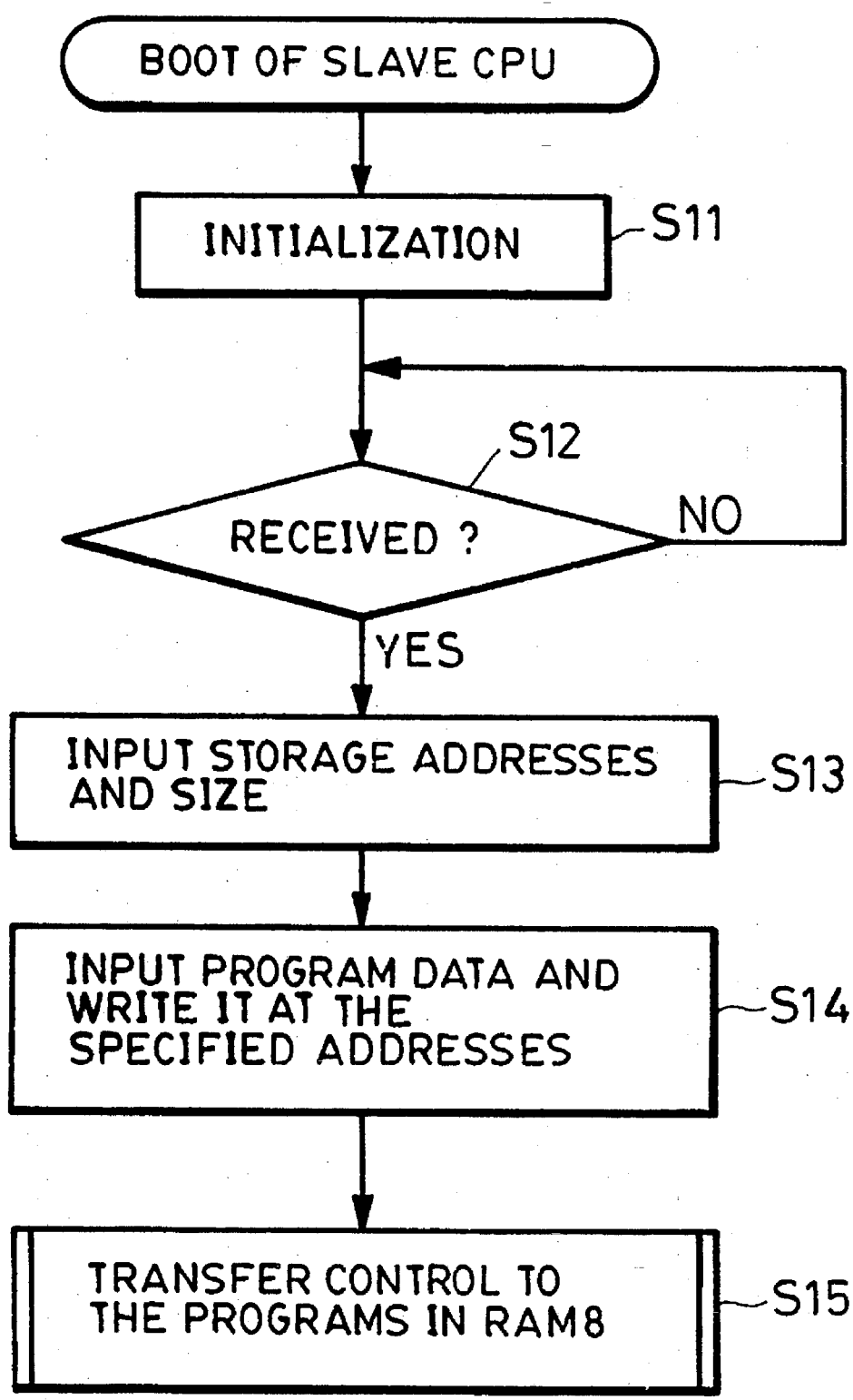
FIG. 7 is a flowchart showing the contents of a boot program for a slave CPU which is used in the first embodiment.

Next, the operation of the slave CPU 6 when the apparatus is switched on will be described below with reference to the flowchart of FIG. 7. The program related to the flowchart is stored in the boot ROM 7.

When the apparatus is switched on, the slave CPU 6 performs initialization associated with individual circuits (not shown) which are under the control of the slave CPU 6, as well as initialization associated with the serial communication with the master CPU 1 in step S11. When the series of initializing operations is completed, the slave CPU 6 sends out to the master CPU 1 a status signal which indicates that the slave CPU 6 is ready for receiving data (the master CPU 1 checks reception of this status signal to make a determination as to whether the slave CPU 6 is ready for receiving data). Next, in step S12, it is determined whether or not data is received from the master CPU 1.

If there is a data reception, the addresses in the RAM 8 at which the program data for the slave CPU is to be stored and the size of the program data are input in step S13. Thereafter, the program data transferred from the master CPU is written in sequence at the designated addresses in the RAM 8. When writing of data of the designated size has been completed, i.e., when the programs for the slave CPU 6 have been stored, control of the slave CPU 6 is transferred to the programs in the RAM 8 in step S15.

The programs and constant data for each of at least two CPUs can thus be supplied externally from the same storage medium through the same interface.

A second embodiment of the present invention will be described below with reference to FIG. 2.

Figure 2:
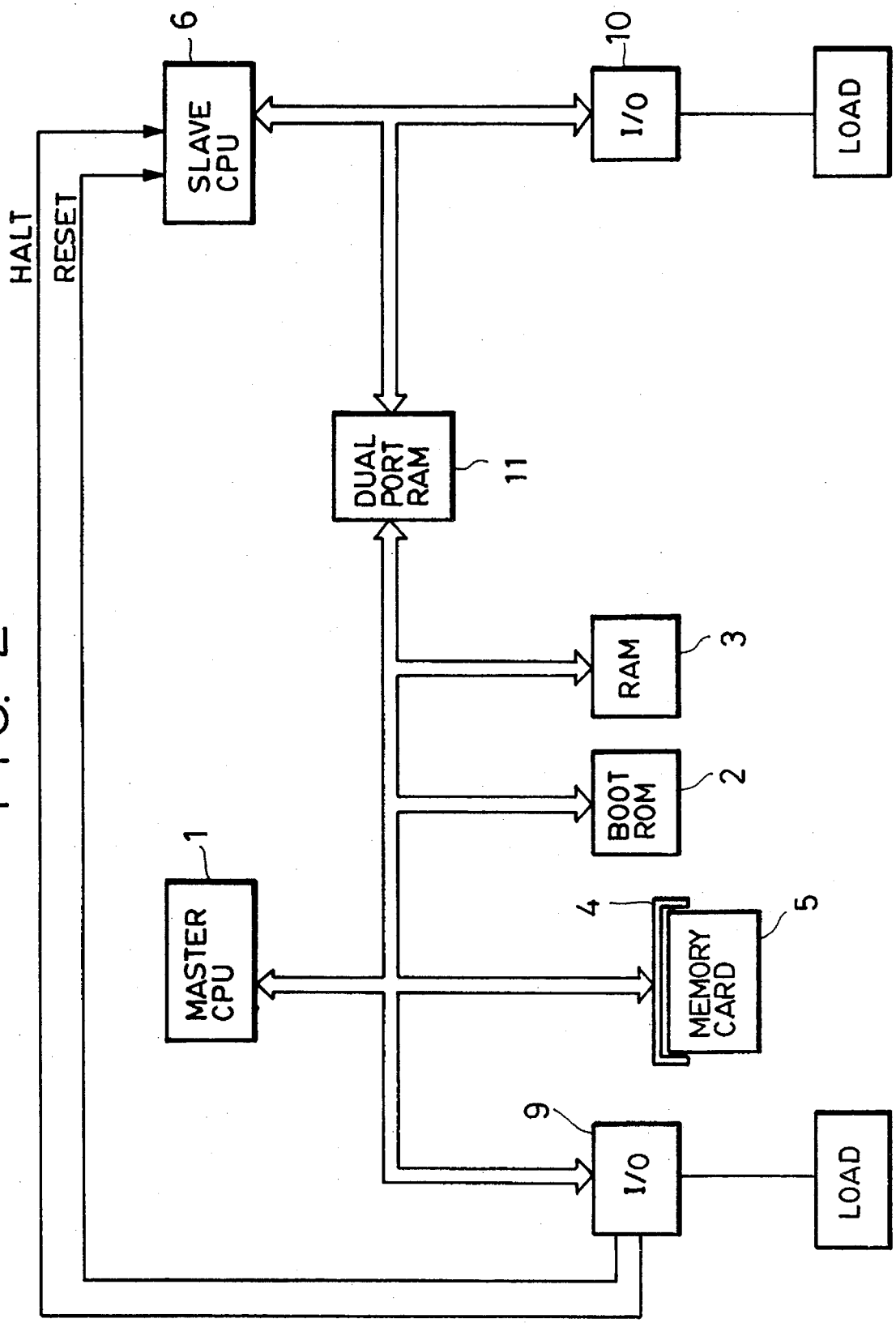
FIG. 2 is a block diagram of a second embodiment of the electronic apparatus according to the present invention.

In FIG. 2, reference numerals 1 through 10 denote parts which are the same as those of the first embodiment, and a description thereof is omitted. In FIG. 2, reference numeral 11 denotes a RAM for storing the programs and constant data for the slave CPU 6 for execution. The RAM 11 is a two-port RAM (a so-called dual port RAM), and is connected to both the CPU bus of the master CPU 1 and to the CPU bus of the slave CPU 6 so that it can be accessed by both the master CPU 1 and the slave CPU 6. The master CPU 1 is designed to control through the I/O 9 a HALT signal and a RESET signal for the slave CPU 6.

When the apparatus is switched on, the master CPU 1 reads out the memory contents from the memory card 5 according to the programs stored in the boot ROM 2. If the read out memory contents are the program data for the master CPU, they are stored in the RAM 3. If the memory contents read out from the memory card 5 are the program data for the slave CPU 6, they are stored in the two-port RAM 11. During storage, the master CPU 1 holds the slave CPU 6 in a halt state by the use of a HALT signal. After all of the necessary data has been read out from the memory card 5, the master CPU 1 cancels the HALT state of the slave CPU 6 and resets the slave CPU 6 by the use of a RESET signal. The reset slave CPU 6 initiates operation according to the programs stored in the two-port RAM 11.

The programs and constant data for two or more CPUs can thus be supplied externally through the same interface. In this way, provision of the boot ROM of the slave CPU 6 is eliminated.

Figure 3:
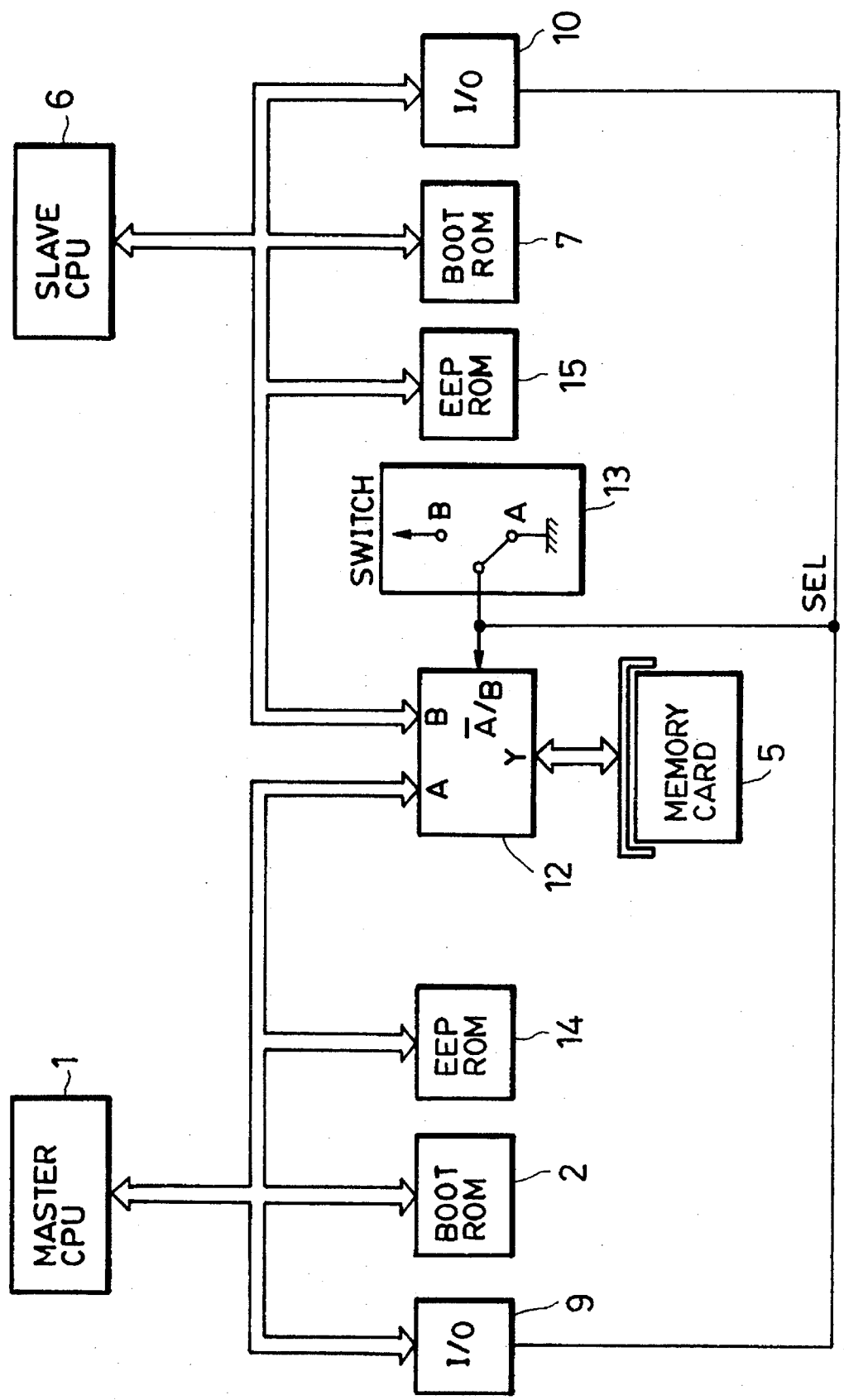
FIG. 3 is a block diagram of a third embodiment of the electronic apparatus according to the present invention.

A third embodiment of the present invention will be described below with reference to FIG. 3. In FIG. 3, the same reference numerals are used to denote parts which are the same as those of the first embodiment.

In FIG. 3, change over of the bus through which the memory card is accessed is made by a bus selector unit 12. The selection to be made by the bus selector 12 is designated by a switch unit 13. When the switch unit 13 is set to "A", it is possible for the master CPU 1 to read out the memory contents from the memory card 5. When the switch unit 13 is switched to "B", the slave CPU 6 can read out the contents of the memory card 5. The state in which the switch unit 13 is set is input to both CPUs through the corresponding I/Os as a SEL signal. EEPROMs (electrically erasable and programmable ROMs) 14 and 15 are electrically erasable non-volatile memories and store the programs and constant data for the master CPU 1 and slave CPU 6, respectively. Battery backed up RAMs may be used in place of the EEPROMs.

When the apparatus is switched on, both the master CPU 1 and the slave CPU 6 are initialized according to the programs stored in the boot ROMs 2 and 7, respectively. Next, the master CPU 1 and the slave CPU 6 check the state of the SEL signal so as to determine whether they are to read out the programs from the memory card 5. When the SEL signal has a logical low level, i.e., when the state of the SEL signal is "0", the master CPU 1 stores the contents of the memory card 5 in the EEPROM 14, and then control according to the programs stored in the boot ROM 2 is transferred to control according to the updated programs stored in the EEPROM 14.

The slave CPU 6 transfers control from the programs stored in the boot ROM 7 to the programs stored in the EEPROM 15 which are updated by reading out the programs from the memory card 5 and storing them in EEPROM 15. When the SEL signal has a logical high level, i.e., when the state of the SEL signal is "1", the slave CPU 6 can update the programs stored in the EEPROM 15.

Version up of the programs for two or more CPUs can thus be performed externally.

A fourth embodiment of the present invention will be described below with reference to FIG. 4. The same reference numerals are used to denote parts which are the same as those of the first embodiment.

Figure 4:
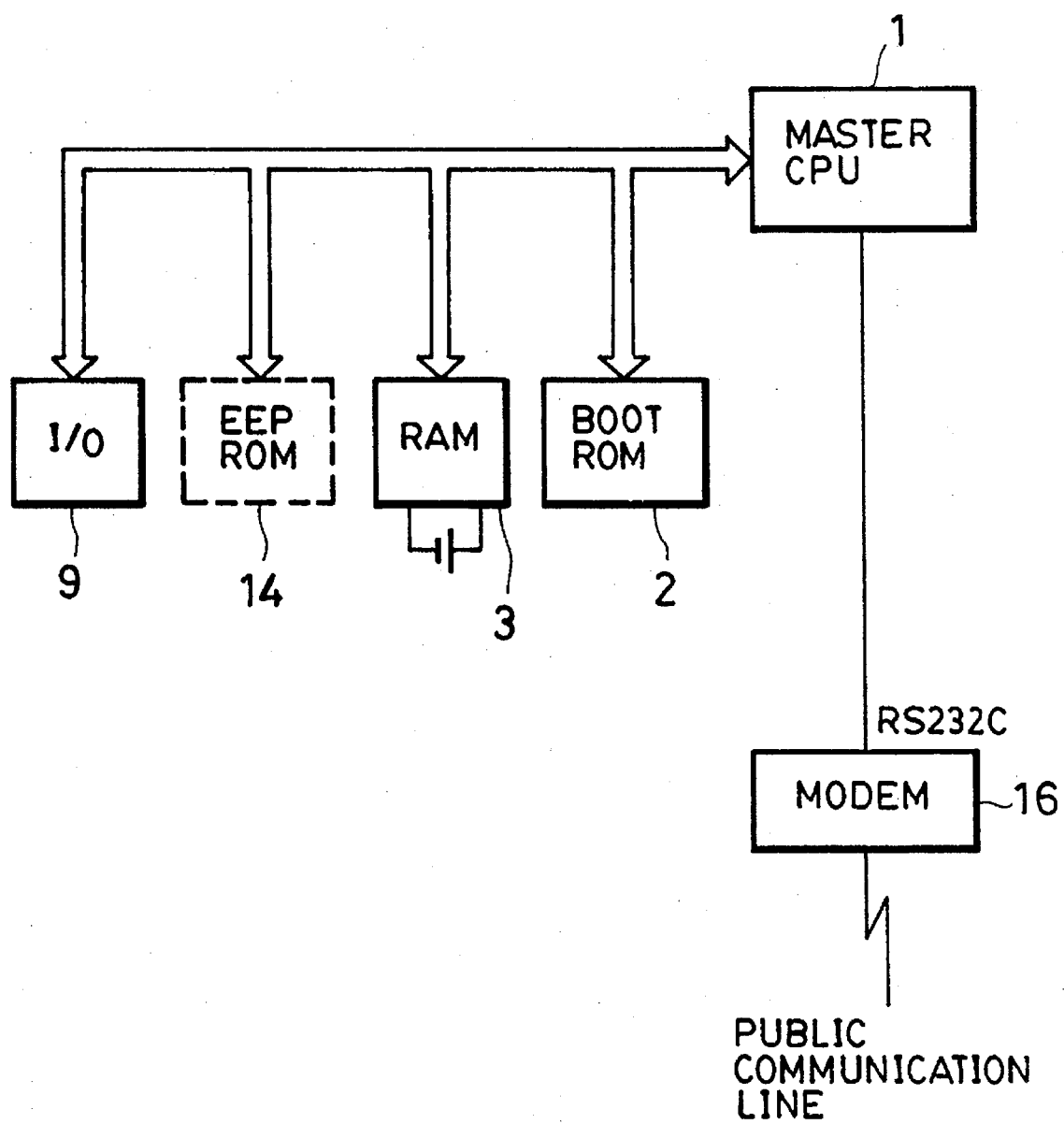
FIG. 4 is a block diagram of a fourth embodiment of the electronic apparatus according to the present invention.

In FIG. 4, a modem 16 is connected to the CPU 1 through an RS232C interface port. The program data sent through a public communication line is stored in either the RAM 3 or the EEPROM 14.

Thus, version up of the programs and constant data for the CPU can be performed externally.

As will be understood from the foregoing description, in the present invention, it is possible to supply the program data for a plurality of CPUs, i.e., the programs and constant data to which the programs refer, from the same data supply device.

Particularly, when the data read out by a first CPU is necessary for a second CPU, the first CPU 1 stores it in a common memory area to which both the first and second CPUs can gain an access. Thereafter, the second CPU is activated. Consequently, it is possible to supply data necessary for either one of a plurality of CPUs from the same storage medium.

Furthermore, it is possible to supply data required for either one of a plurality of CPUs from the same storage medium by changing over the path through which the plurality of CPUs make an access to the storage medium.

Furthermore, version up of the programs is made possible from a remote site by using a public communication line or LAN as an external data supply means.

The electronic apparatus of the present invention in which control is performed by a plurality of microcomputers may be a copying machine, a facsimile machine, an electrophotographic printer, or a bubble jet type ink jet printer.

Having described our invention as related to the embodiments shown in the accompanying drawings, it is our intention that the invention not be limited by any of the details of the description, but rather be construed broadly within its spirit and scope as set out in the accompanying claims.

What is claimed is:

1. An electronic apparatus comprising:
    a first microcomputer and a first memory connected with each other by a first bus line;
    a second microcomputer and a second memory connected with each other by a second bus line;
    attaching means for detachably attaching a storage medium;
    a connecting means for connecting one of the first bus line and the second bus line selectively to said attaching means;
    a third memory connected to the first bus line and for storing a program initially executed by the first microcomputer; and
    a fourth memory connected to the second bus line and for storing a program initially executed by the second microcomputer,
    wherein, when the first bus line is connected to said attaching means, which attaches a storage medium storing a version-up program for the first microcomputer, said first microcomputer transfer the version-up program from the attached storage medium into the first memory and executes the versioned-up program in the first memory, and when said first bus line is not connected to said attaching means, said first microcomputer executes a program in the first memory which is not versioned-up, in accordance with a program stored in the third memory, and
    wherein, when the second bus line is connected to said attaching means, which attaches a storage medium storing a version-up program for the second microcomputer, said second microcomputer transfer the version-up program from the attached storage medium into the second memory and executes the versioned-up program in the second memory, and when said second bus line is not connected to said attaching means, said second microcomputer executes a program in the second memory which is not versioned-up, in accordance with a program stored in the fourth memory.

2. An electronic apparatus according to claim 1, wherein said third and said fourth memories are respectively comprised by a first boot ROM for storing a program for initializing said first microcomputer and a second boot ROM for storing a program for initializing said second microcomputer.

3. An electronic apparatus according to claim 1, wherein said attaching means is structured and arranged to attach a memory card as the storage medium.

4. An electronic apparatus according to claim 1, wherein said apparatus is either one of a copying machine, a facsimile machine, an electrographic printer, and an ink jet printer.

5. An electronic apparatus according to claim 1, further comprising a switching means,
    wherein said connecting means connects one of the first bus line and the second bus line in accordance with a state of said switching means.

6. An electronic apparatus according to claim 1, wherein at least one of said first and said second memories includes one of an EEP-ROM and a backed-up RAM.

* * * * *

UNITED STATES PATENT AND TRADEMARK OFFICE
CERTIFICATE OF CORRECTION

PATENT NO. : 5,552,981

DATED : September 3, 1996

INVENTOR : MASANORI YAMADA

It is certified that error appears in the above-identified patent and that said Letters Patent is hereby corrected as shown below:

<u>COLUMN 6</u>

Line 22, "transfer" should read --transfers--;
Line 33, "transfer" should read --transfers--.

Signed and Sealed this

Eleventh Day of March, 1997

Attest:

BRUCE LEHMAN

Attesting Officer        Commissioner of Patents and Trademarks